(12) United States Patent
Surisetty et al.

(10) Patent No.: US 11,949,971 B2
(45) Date of Patent: Apr. 2, 2024

(54) SYSTEM AND METHOD FOR AUTOMATICALLY IDENTIFYING KEY DIALOGUES IN A MEDIA

(71) Applicant: PRIME FOCUS TECHNOLOGIES LIMITED, Bengaluru (IN)

(72) Inventors: Nagaraju Surisetty, Kadapa (IN); Muralidhar Kolar Sridhar, Bengaluru (IN); Nitesh Kumar M, Bengaluru (IN); Shubham Jaiswal, Morang (NP); Suhas Kodandaram Jamadagni, Mysuru (IN); Adrish Bera, Bengaluru (IN)

(73) Assignee: PRIME FOCUS TECHNOLOGIES LIMITED, Bengaluru (IN)

( * ) Notice: Subject to any disclaimer, the term of this patent is extended or adjusted under 35 U.S.C. 154(b) by 0 days.

(21) Appl. No.: 17/939,272

(22) Filed: Sep. 7, 2022

(65) Prior Publication Data

US 2023/0254552 A1    Aug. 10, 2023

(30) Foreign Application Priority Data

Feb. 8, 2022 (IN) .............................. 202241006748

(51) Int. Cl.
    *H04N 7/167*     (2011.01)
    *G06F 16/783*     (2019.01)
    (Continued)

(52) U.S. Cl.
    CPC ....... *H04N 21/8549* (2013.01); *G06F 16/784* (2019.01); *G06F 16/7844* (2019.01); *G06F 40/205* (2020.01)

(58) Field of Classification Search
CPC ......... H04N 21/8549; H04N 21/23418; H04N 21/44008; H04N 21/4394; G06F 40/30; G06F 40/35; G06F 40/289
See application file for complete search history.

(56) References Cited

U.S. PATENT DOCUMENTS

| 7,933,338 | B1 * | 4/2011 | Choudhry | ............... G06F 16/70 |
| | | | | 375/240.26 |
| 2007/0188657 | A1 * | 8/2007 | Basson | ............ H04N 21/43076 |
| | | | | 704/E21.02 |

(Continued)

*Primary Examiner* — Gigi L Dubasky
(74) *Attorney, Agent, or Firm* — Joy S. Goudie; Goudie, PLLC

(57) ABSTRACT

A system and a method for automatically identifying key dialogues in media is disclosed herein. In the method disclosed herein, the key dialogues engine receives the media asset and extract transcript data and supplementary data. The key dialogues engine processes the transcript data into a plurality of transcript data elements and associate the transcript data elements with respective data elements selected from the supplementary data. The key dialogues engine identifies one or more key dialogues from the associated transcript data elements based on configurable criteria, in operable communication with one or more of a plurality of data sources, wherein the configurable criteria comprises one or more of repetitive keywords, rhyming words, audio signal levels, matching keywords, text-based sentiments, dialogue similarity, repetitive dialogues, signature dialogues, entry dialogues recited by actors comprising protagonists and antagonists, faces of the actors, celebrity detection, image labels, and vector similarity scores.

15 Claims, 5 Drawing Sheets

(51) Int. Cl.
*G06F 40/205* (2020.01)
*H04N 21/8549* (2011.01)

(56) References Cited

U.S. PATENT DOCUMENTS

| | | | |
|---|---|---|---|
| 2018/0061256 A1* | 3/2018 | Elchik | G09B 5/02 |
| 2020/0007947 A1* | 1/2020 | NarayanaMurthy | |
| | | | H04N 21/4223 |
| 2020/0327160 A1* | 10/2020 | Hsieh | H04N 21/26603 |
| 2021/0117417 A1* | 4/2021 | Hendrickson | G06F 16/90 |
| 2022/0270634 A1* | 8/2022 | Jamadagni | G11B 27/34 |

* cited by examiner

SYSTEM AND METHOD FOR AUTOMATICALLY IDENTIFYING KEY DIALOGUES IN A MEDIA

BACKGROUND

Technical Field

The present invention, in general, relates to media processing technology. More particularly, the present invention relates to a system and a method for automatically identifying key dialogues in a media asset and in specific, the present invention relates to a system and a method of identifying key dialogues automatically from an entertainment content which is used to create promotional packages and trailers in the media industry.

Description of the Related Art

With the advancements in movie making technologies, the amount of media content, for example, video content, created on a daily basis has grown exponentially. For these large amounts of media assets, for example, videos, to reach their targeted audience, media houses have to create short promotional videos, for example promos or trailers, and distribute them across the globe as fast as possible to gain momentum and advantage over their competition. Creating a promotional video is typically performed by a manual process of watching a video, identifying and marking important or interesting parts or segments to be spliced into a trailer, cutting these parts or segments out of the video for inclusion in the trailer, and editing the trailer manually. To cater to different groups of audiences, multiple trailers need to be created, which require repeating the above-mentioned manual process multiple times. This repetition is time consuming and tedious as it involves a person meticulously watching the video, noting down interesting dialogue segments of the video, extracting the interesting dialogues from the, and then splicing the interesting segments together to create a final trailer. Therefore, there is a need for an automated system and method that substantially eases video browsing and expensive supervision requirements by automatically identifying these interesting dialogue segments, also referred to as "key dialogues", in the video to be used in the creation of a trailer.

In addition to identifying the key dialogues in the video, it is required to identify the popular characters or famous actors' segments in the media to attract the crowd attention. Also, the aid of an expert would be required for identifying and extracting frame-accurate video segments and stitching these frame-accurate video segments into the trailer, which is time consuming as it requires multiple viewings of the video and assessments of the video segments for quality. When a video segment containing key dialogues and popular characters needs to be extracted from the video for marketing and syndication purposes, a marketing team would need to watch the video, identify video segments containing key dialogues, and then request an editor to have these video segments edited, packaged, and then distributed, which is time consuming and may not necessarily ensure that the best video segment is selected. Conventional methods for identifying key dialogues are either manual or rely substantially on deep neural networks and operate on a visual side, which requires a large amount of processing power to operate and a graphics processing unit (GPU) to train a model on a large dataset.

Hence, there is a long-felt need for a system and a method for automatically identifying key dialogues in media, while addressing the above-recited problems associated with the related art.

OBJECTIVES OF THE EMBODIMENTS

The primary objective of the embodiment herein is to provide a system and a method for automatically identifying key dialogues in media.

Another object of the embodiment herein is to use artificial intelligence for automatically identifying key dialogues in media assets, for example, videos, and marking video segments containing the key dialogues in the videos.

Yet another object of the embodiment herein is to use artificial intelligence for automatically identifying popular characters present in the video segments.

Yet another object of the embodiment herein is to automatically detect and rank multiple dialogues of a media content using multiple data sources.

Yet another object of the embodiment herein is to identify key dialogues of a video stream based on transcript data of the video along with image labels of each frame of the video and facial recognition of the characters present in the video.

The objects disclosed above will be realized and achieved at least by the elements, features, and combinations particularly pointed out in the claims. The objects disclosed above have outlined, rather broadly, the features of the embodiments disclosed herein in order that the detailed description that follows is better understood. The objects disclosed above are not intended to determine the scope of the claimed subject matter and are not to be construed as limiting of the embodiments disclosed herein. Additional objects, features, and advantages of the embodiments herein are disclosed below. The objects disclosed above, which are believed to be characteristic of the embodiments disclosed herein, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The embodiments herein addresses the above-recited needs for a system and a method for automatically identifying key dialogues in media. In an embodiment, the system disclosed herein comprises a plurality of processors, a non-transitory, computer-readable storage medium operably and communicatively coupled to the processors, and a key dialogues engine. The key dialogues engine is configured to define computer program instructions executable by at least one of the processors for automatically identifying and ranking key dialogues in a media asset. In the method disclosed herein, the key dialogues engine receives the media asset and extract characteristic data from the media asset, wherein the characteristic data comprises transcript data and supplementary data. The key dialogues engine processes the transcript data into a plurality of transcript data elements and associate the transcript data elements with respective data elements selected from the supplementary data. The key dialogues engine identifies one or more key dialogues from the associated transcript data elements based on configurable criteria, in operable communication with one or more of a plurality of data sources, wherein the configurable criteria comprises one or more of repetitive keywords, rhyming words, audio signal levels, matching keywords, text-based sentiments, dialogue similarity, repetitive dialogues, signature dialogues, entry dialogues recited by actors comprising protagonists and antagonists, faces of the actors, celebrity detection, image labels, and vector similarity scores.

According to one embodiment herein, the supplementary data comprises at least one of image label data and face recognition data, and wherein, during the processing of the transcript data, one or more of the computer program instructions, which when executed by the at least one processor, cause the at least one processor to divide the transcript data into a plurality of sentence data elements and associate each of the sentence data elements with respective image label data and face recognition data in accordance with time codes of the sentence data elements.

According to one embodiment herein, one or more of the computer program instructions is executed by the at least one processor, wherein the at least one processor cause the at least one processor to generate a comprehensive database from the plurality of data sources, wherein the comprehensive database is configured to store a plurality of keywords, rhyming words, dialogues, image labels, text-based sentiments, face data of actors, image label data, and information of actors selected from a plurality of media assets.

According to one embodiment herein, the at least one processor is configured to identify one or more keywords that are repeated in individual and adjacent ones of the associated transcript data elements, in communication with a keyword database configured as one of the data sources for identifying the one or more key dialogues from the associated transcript data elements based on the repetitive keywords.

According to one embodiment herein, the at least one processor is configured to identify one or more rhyming words having a similar phonetics scheme in individual and adjacent ones of the associated transcript data elements, in communication with a rhyming word database configured as one of the data sources for identifying the one or more key dialogues from the associated transcript data elements based on the rhyming words.

According to one embodiment herein, the at least one processor is configured to determine occurrence of one or more key audio events proximal to each of the associated transcript data elements based on the audio signal levels of the media asset for identifying the one or more key dialogues from the associated transcript data elements based on the audio signal levels.

According to one embodiment herein, the at least one processor is configured to extract keywords from each of the associated transcript data elements and compare the extracted keywords with a predetermined list of keywords to determine a count of the matching keywords in the each of the associated transcript data elements, wherein the predetermined list of keywords is stored in a keyword database configured as one of the data sources for identifying the one or more key dialogues from the associated transcript data elements based on the matching keywords.

According to one embodiment herein, the at least one processor is configured to classify each of the associated transcript data elements as one of positive, negative, and neutral, and compute a probability for the each of the associated transcript data elements for identifying the one or more key dialogues from the associated transcript data elements based on the text-based sentiments.

According to one embodiment herein, the at least one processor is configured to determine a similarity parameter defining a similarity between each of the associated transcript data elements and each of a plurality of dialogues, wherein the plurality of dialogues is stored in a dialogues database configured as one of the data sources and identify one or more of repetitive dialogues and signature dialogues in the media asset by executing a probabilistic language model algorithm for identifying the one or more key dialogues from the associated transcript data elements.

According to one embodiment herein, the at least one processor is configured to identify one or more of repetitive dialogues and signature dialogues in the media asset by executing a probabilistic language model algorithm and identify one or more entry dialogues recited by actors comprising one of protagonists and antagonists in the media asset, in communication with a face database and an actor information database configured as data sources for identifying the one or more key dialogues from the associated transcript data elements.

According to one embodiment herein, the at least one processor is configured to identify presence of one or more celebrities within time codes of the each of the associated transcript data elements, in communication with one or more of a face database and an actor information database configured as data sources for identifying the one or more key dialogues from the associated transcript data elements based on the celebrity detection.

According to one embodiment herein, the at least one processor is configured to determine a match in the image labels that are present within time codes of the each of the associated transcript data elements with a predetermined list of image labels, wherein the predetermined list of image labels is stored in an image labels database configured as one of the data sources for identifying the one or more key dialogues from the associated transcript data elements based on the image labels.

According to one embodiment herein, the at least one processor is configured to generate vectors for the associated transcript data elements, compute a vector similarity score defining a similarity between each of the vectors, store the vector similarity score of the each of the associated transcript data elements in a similarity matrix, and convert the similarity matrix into a graphical representation for computation of a rank of the each of the associated transcript data elements for identifying the one or more key dialogues from the associated transcript data elements.

According to one embodiment herein, the at least one processor is configured to allocate a weightage to each of the configurable criteria, compute a score for the each of the associated transcript data elements based on the configurable criteria met by the each of associated transcript data elements, and rank the each of the associated transcript data elements based on the computed score.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The foregoing summary, as well as the following detailed description, is better understood when read in conjunction with the appended drawings. For illustrating the present invention, exemplary constructions of the present invention are shown in the drawings. However, the present invention is not limited to the specific methods and components disclosed herein. The description of a method step or a component referenced by a numeral in a drawing is applicable to the description of that method step or component shown by that same numeral in any subsequent drawing herein.

The specific features of the present invention are illustrated in some drawings and not in others for convenience only as each feature may be combined with any or all of the other features in accordance with the embodiments herein.

DETAILED DESCRIPTION OF THE EMBODIMENTS

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Figure 1:
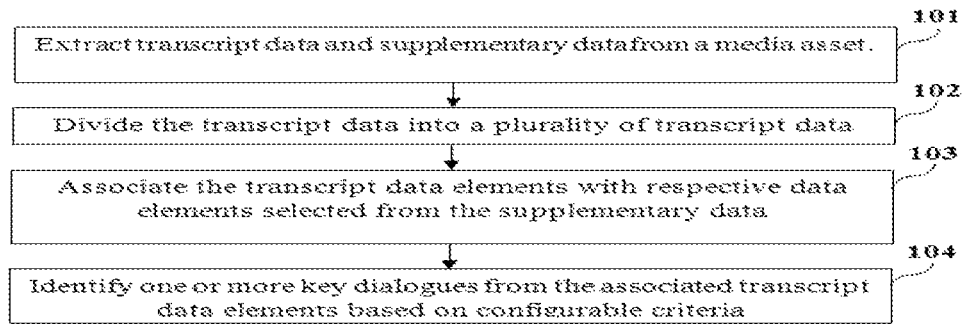
FIG. 1 illustrates a flowchart of a method for automatically identifying key dialogues in a media asset, according to one embodiment herein.

FIG. 1 illustrates a flowchart of a method for automatically identifying key dialogues in a media asset, according to one embodiment herein. As used herein, "media asset" refers to a digital asset comprising media content, for example, audio content, image content, video content, audiovisual content, multimedia content, animations, textual content, sound effects, visual effects, graphics, etc., or any combination thereof. A media asset, for example, a video is typically composed of multiple scenes, each of which is composed of shots. Each of these shots is a sequence of interrelated frames captured contiguously by a single image capture device in a particular time period. Each shot represents a continuous action in time and space. In an embodiment, the method disclosed herein employs a key dialogues engine configured to define computer program instructions executable by one or more processors for automatically identifying key dialogues in a media asset using artificial intelligence (AI). In an embodiment, the key dialogues engine is configured as an AI engine.

According to one embodiment herein, the one or more processors is configured to create a comprehensive database from the plurality of data sources, wherein the comprehensive database is configured to store a plurality of keywords, rhyming words, dialogues, image labels, text-based sentiments, face data of actors, image label data, and information of actors selected from a plurality of media assets. In one embodiment, the key dialogues engine is in communication with the comprehensive database. In one embodiment, the comprehensive database further includes at least one or more of a rhyming word database, a keyword database, a dialogues database, an actor information database, a face database, an image labels database, and the like. In one embodiment, keywords, rhyming words, dialogues, image labels, text-based sentiments, face data of actors, image label data, and information of actors are manually added to the comprehensive database. In another embodiment, keywords, rhyming words, dialogues, image labels, text-based sentiments, face data of actors, image label data, and information of actors are added to the comprehensive database through any known automated methods for generating keywords/key phrases.

In the method disclosed herein, the key dialogues engine is configured to extract 101 transcript data and supplementary data from the media asset, for example, a video. In one embodiment, the transcript data and the supplementary data are together referred to as characteristic data. The transcription data is a text data of any original media asset which helps in systematically arranging and analyzing the media asset. The one skilled in the art would understand that the extraction of the transcript data of the media asset is carried out through any standardized AI-based methods known in the art or invented in the future. Further, in one embodiment, the supplementary data includes image label data and face recognition data. An exemplary implementation of the method for automatically identifying key dialogues in a video is described in FIG. 2. The key dialogues engine is configured to divide 102 the transcript data into a plurality of transcript data elements and associate 103 the transcript data elements with respective data elements selected from the supplementary data. Association of the transcript data elements with respective data elements selected from the supplementary data may carried out through various methods. The key dialogues engine is configured to identify 104 one or more key dialogues from the associated transcript data elements based on configurable criteria. In one embodiment, the configurable data includes keywords, rhyming words, dialogues, image labels, text-based sentiments, face data of actors, image label data, and information of actors.

Figure 2:
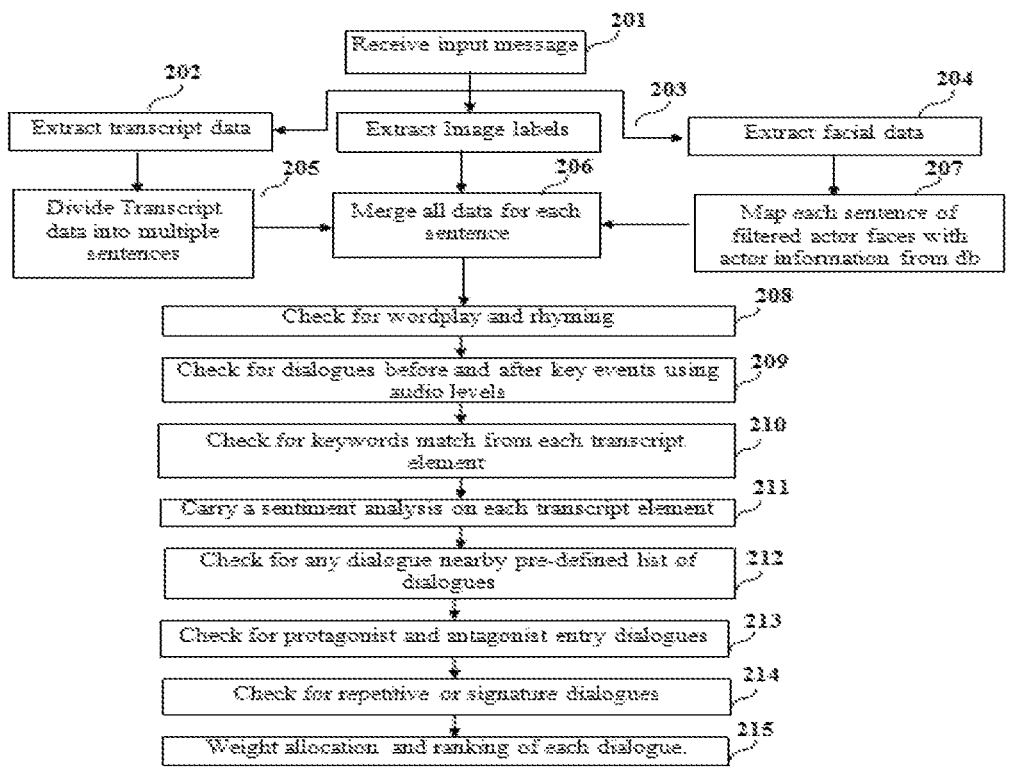
FIG. 2 illustrates a flowchart of an exemplary implementation of a method for automatically identifying key dialogues in a video, according to one embodiment herein.

FIG. 2 illustrates an architectural block diagram showing an implementation of the key dialogue engine in a computing device for automatically detecting key dialogues and ranking using multiple sources, according to one embodiment herein. At 201, the key dialogue engine receives a media asset, such as a video clip. In one embodiment, the media asset may be received from a video streaming platform. At 202, the key dialogue engine extracts transcript data. The extraction of the transcript data of the media asset is carried out through any standardized AI-based methods known in the art or invented in the future. At 203, the key dialogue engine extracts image label of each frame of the media asset such as the video clip through image analysis. The one skilled in the art understands that the extraction of the image label of each of the frames of the media asset is carried out through any standardized AI-based methods known in the art or invented in the future. At 204, the key dialogue engine extracts facial recognition data of characters present in the video. In one embodiment, the facial recognition data is extracted based on any known video metadata extraction AI engine. In one example, the video metadata extraction AI engine receives the video clip and further extracts all frames in the video clip and process each frame to get the data of character faces.

At 205, the key dialogue engine divides the transcript data into a plurality of sentence data elements (or alternatively referred as 'a plurality of transcript data elements'). In one embodiment, the key dialogue engine divides the transcript data into multiple sentence data elements based on punctuations such as commas, full stops, exclamation mark, question mark, and the like. In another embodiment, the key dialogue engine divides the transcript data into multiple sentence data elements based on clips and/or shots of the media asset and associate the transcript data with clip and/or shot. At 207, the key dialogues engine associates each sentence data element with respective labels data and celebrity faces data. In one embodiment, the key dialogue engine extracts image labels data and extract every character's face data. In one example, the key dialogue engine uses an application programming interface (API or web API) to extract image labels and faces data such as REST API web services. The key dialogue engine retrieves celebrity information from the comprehensive database wherein the celebrity information which got fetched from the comprehensive database includes lead actors' details such as Protagonists like Hero and Heroine, Antagonist like Villains. The key dialogue engine uses the lead actors' details to eliminate the unwanted faces data. Further, the key dialogue engine eliminates the unwanted faces data based on celebrity information acquired from the information of actors stored in the comprehensive database. In one embodiment, image labels data and transcript data will have time codes. At 206, the key dialogue engine merges or associates image labels data and faces data to each sentence data element using time codes to generate associated transcript data elements.

Further, as per FIG. 2, the key dialogue engine identifies one or more key dialogues from the associated transcript data elements of the media asset based on configurable criteria, wherein the configurable criteria comprises one or more of repetitive keywords, rhyming words, audio signal levels, matching keywords, text-based sentiments, dialogue similarity, repetitive dialogues, signature dialogues, entry dialogues recited by actors comprising protagonists and antagonists, faces of the actors, celebrity detection, image labels, and vector similarity scores. At 208, the key dialogues engine checks for wordplay and rhyming wherein the checking wordplay includes identification of one or more keywords that are repeated in individual and adjacent of the associated transcript data elements. The list of standardized keywords are acquired from the keyword database as the key dialogue engine is configured to be in communication with the keyword database configured as one of the data sources. Further, checking rhyming includes identification of one or more rhyming words having a similar phonetics scheme in individual and in adjacent associated transcript data elements. To check the rhyming, the key dialogue engine acquired the list of standardized phonetics from the rhyming word database while being in communication with the rhyming word database configured as one of the data sources. In one embodiment, one or more key dialogues is characterized by a set of certain keywords or its rhyme words having a similar phonetics scheme that are often repeated. The identification of one or more key dialogues based on wordplay and rhyming is described in FIGS. 3A and 3B in detail.

Figure 3A:
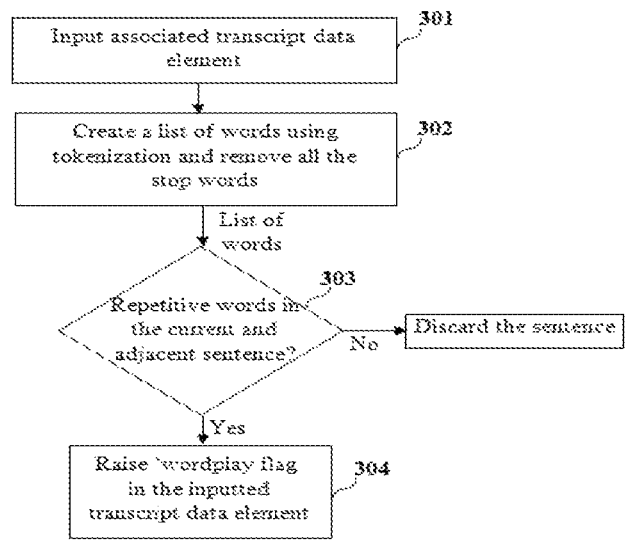
FIG. 3A illustrates a flowchart of a method for automatically identifying key dialogues in a media asset such as video based on wordplay, according to one embodiment herein.

FIG. 3A illustrates a flowchart of a method for automatically identifying key dialogues in a media asset such as video based on wordplay, according to one embodiment herein. At 301, the key dialogue engine receives at least one associated transcript data elements of plurality associated transcript data elements. At 302, the key dialogue engine creates a list of words using tokenization and remove all the stop words. In one embodiment, tokenization is a process of splitting of the sentence into smaller units, such as individual words or terms. Each of these smaller units are called tokens. In one example, tokenization requires natural language processing tasks where each word needs to be captured and subjected to further analysis like classifying and counting for a particular sentiment. Once the associated transcript data element is tokenized and a list of tokenized words are generated, the key dialogue engine removes all the stop words from the list of words. In one embodiment, stop words are the words which do not add much meaning to a sentence. Stop words can safely be ignored without sacrificing the meaning of the sentence. For example, the words like the, he, have etc. At 303, the key engine checks for repetitive keywords in the list of words of the current sentence as well as at least one adjacent sentence. The keywords are identified by the key dialogue engine based on the keyword database. At 304, if the key dialogue engine identifies one or more repetitive keywords, then the input sentence (or the input associated transcript data element) is marked as including wordplay and raise 'wordplay flag' in the inputted associate transcript data element.

Figure 3B:
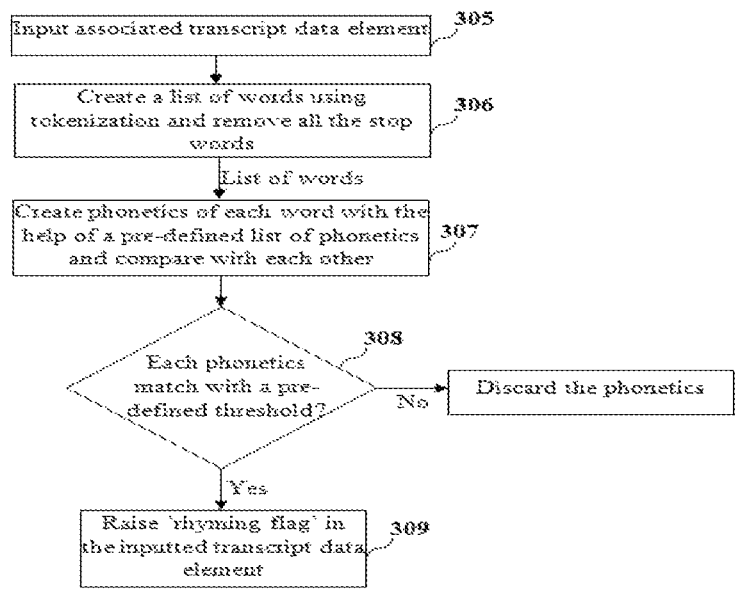
FIG. 3B illustrates a flowchart of a method for automatically identifying key dialogues in a media asset such as video based on rhyming, according to one embodiment herein.

FIG. 3B illustrates a flowchart of a method for automatically identifying key dialogues in a media asset such as video based on rhyming, according to one embodiment herein. At 305, the key dialogue engine receives at least one associated transcript data element of the plurality associated transcript data elements. At 306, the key dialogue engine creates a list of words using tokenization and remove all the stop words. Once the sentence (or the associated transcript data element) is tokenized and a list of tokenized words are generated, the key dialogue engine removes all the stop words from the list of words. At 307, the key dialogue engine creates phonetics of each word with the help of a pre-defined list of phonetics wherein each phonetics of the sentence is compared with the pre-defined list of phonetics. At 308, the key dialogue engine checks for matching of one or more rhyming words having a similar phonetics scheme in individual and adjacent associated transcript data elements, wherein the pre-defined list of phonetics is acquired by the rhyming word database configured as one of the data sources. The phonetics are identified by the key dialogue engine based on the rhyming word database. At 309, if the key dialogue engine identified one or more matching rhyming words, then the sentence is marked as including rhyming and raise a 'rhyming flag' in the inputted associate transcript data element.

Further, as per FIG. 2, at 209, the key dialogues engine checks for dialogues before and after any key events. The key dialogues engine identifies the one or more key dialogues from the associated transcript data elements based on the audio signal levels. In one embodiment, the key dialogues engine determines occurrence of one or more key audio events proximal to each of the associated transcript data elements based on the audio signal levels of the media asset. Accordingly, the key dialogues engine analyses each dialogue to identify any important event that occurred before or after a dialogue based on audio levels. In one embodiment, the audio levels are measured in decibels and is fixed with a threshold limit. The dialogue is enabled with a flag if the dialogue satisfies the threshold limit. In one embodiment, the raised flag(s) are used to rank the dialogues at a later stage along with the dialogues flagged through other sources output.

Figure 4:
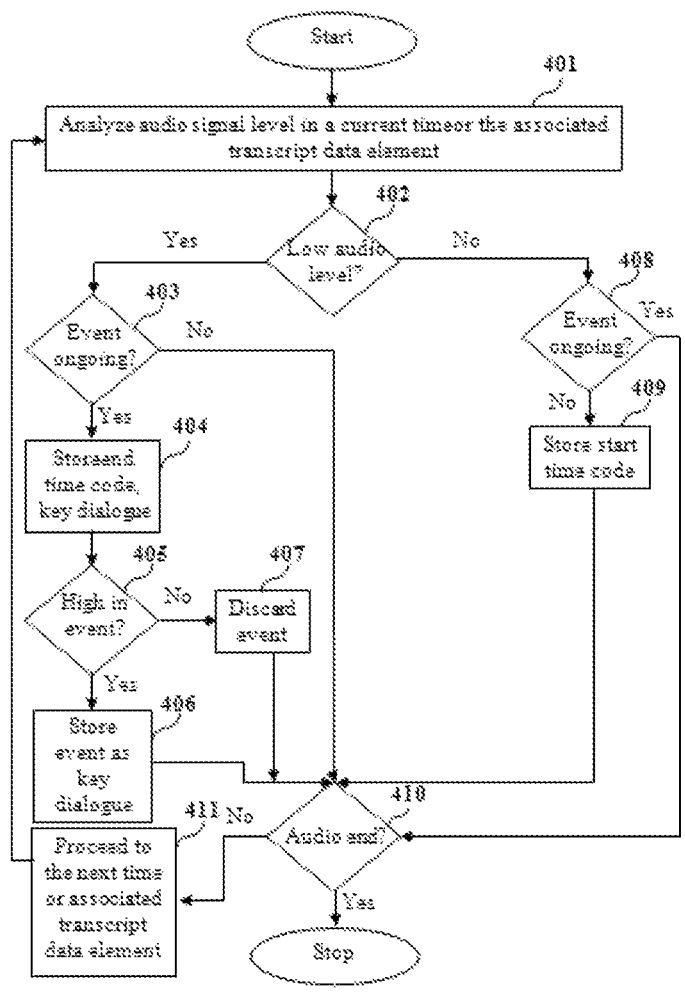
FIG. 4 illustrates a flowchart of a method for automatically identifying key dialogues in a video using audio signal levels of each associated transcript data element of the media asset, according to one embodiment herein.

FIG. 4 illustrates a flowchart of a method for automatically identifying key dialogues in a video using audio signal levels of each associated transcript data element of the media asset, according to one embodiment herein. The key dialogues engine analyzes 401 the audio signal level in a current time or the associated transcript data element and determines 402 whether a low audio signal level is encountered. If the key dialogues engine encounters a low audio signal level, the key dialogue engine determines 403 whether an event is ongoing. If the event is ongoing, the key dialogue engine stores 404 the end time code and key dialogue in an array. The key dialogue engine then determines 405 whether a high audio signal level is encountered in the event. If a high audio signal level is encountered in the event, the key dialogue engine stores 406 the event as a key dialogue and proceeds to step 410. If a high audio signal level is not encountered in the event, the key dialogues engine discards 407 the event and proceeds to step 410. If the event is not ongoing, the key dialogue engine proceeds to step 410.

At step 402, if the key dialogue engine encounters a medium audio signal level or a high audio signal level, the key dialogue engine determines 408 whether an event is ongoing. If the event is ongoing, the key dialogue engine proceeds to step 410. If the event is not ongoing, the key dialogue engine stores 409 the start time code and proceeds to step 410. At step 410, the key dialogue engine determines 410 whether the audio in the audio file has ended. If the audio in the audio file has not ended, the key dialogue engine proceeds 411 to the next time or associated transcript data element for analysis 401. If the audio in the audio file has ended, the key dialogue engine ends the process. In one embodiment, the key dialogues engine calculates audio levels in decibels relative to full scale (dBFS). The key dialogues engine receives the cluster of audio level of the media asset wherein the cluster includes a full-scale audio level of the media asset. The key dialogues engine calculates an average audio level value. Further, the audio level is calculated a pre-defined time before a dialogue or the associated transcript element and after the dialogue or the associated transcript element. In one example, the pre-defined time is 2 seconds, and the audio is measured in the interval of 250 milliseconds. For example, consider a transcript data element, "Where did you get this number? I don't even have it" with below time codes, "start": 1107.8,
"end": 1110.3,
DBFS Value 2 seconds before dialogue:
[35.72570290533895, 36.68417395168262, 37.034980191401395, 37.65985285549987, 37.42022690983759, 36.34698778672656, 36.612091466306104]

DBFS Value 2 seconds after dialogue:
[21.62720593083654, 18.379256024463476, 19.841874566098504, 19.815884452038816, 20.871434713048544, 19.459959751674827, 18.483253398024374]

Average dBFS Value for this dialogue: 22

As dBFS of 2 seconds before dialogue exceed the average DBFS is shown above, and thus a key event is considered to have happened.

The key dialogue engine maintains accuracy of the key dialogue identification process, for example, at a high 90s percentage, by the following methods in various embodiments of the present invention. The key dialogue engine discards events that do not contain any high audio signal levels therein. For example, when there is an ambient noise in the background of a video during a mundane scene in the video, the audio is typically not used to draw attention of a viewer to what is happening in the video. By eliminating such events, the key dialogue engine eliminates most of the plain dialogue sections in the video.

Further, as per FIG. 2, at 210, the key dialogues engine extracts keywords from each of the associated transcript data elements and compare the extracted keywords with a predetermined list of keywords to determine a count of the matching keywords in the each of the associated transcript data element, wherein the predetermined list of keywords is stored in the keyword database configured as one of the data sources. At 211, the key dialogues engine carries a sentiment analysis on each associated transcript data elements. In one embodiment, the key dialogues engine classifies each of the associated transcript data elements as one of positive, negative, and neutral, and compute a probability for the each of the associated transcript data elements. In one embodiment, the key dialogues engine acquires the associated transcript data element and is fed to an AI model, wherein the AI model is trained with sentences annotated for positive, negative, and neutral sentiments. The trained sentences are tokenized and stop words are removed before being used as train and test sets. The AI model classified the transcript data element as at least one of being positive, negative, or neutral. In one example, the classification is carried out with a probability that varies from 0.0 to 1.0. In one embodiment, the key dialogues engine compares the probability value with a threshold value and the transcript data elements with high probability are selected as key dialogues. In one example, consider the transcript data element as, "Where did you get this number? I don't even have it.", the sentiment analysis results, Output of Classification: [('neu', 0.867), ('pos', 0.133), ('neg', 0.0)]. If the threshold value is 0.95, and probability value of the current transcript data element is greater than 0.95, then the current transcript data element is considered as element with sentiment.

At 212, the key dialogues engine, for identifying the one or more key dialogues from the associated transcript data elements, carries out a dialogue similarity analysis, wherein the key dialogues engine determines a similarity parameter defining a similarity between each of the associated transcript data elements and each of a plurality of dialogues, wherein the plurality of dialogues is stored in the dialogues database configured as one of the data sources. In one embodiment, the key dialogues engine calculates a word embedding of each associated transcript data based on cosine similarity to find a distance between the associated transcript data elements and each of a plurality of dialogues. At 213, the key dialogues engine, for identifying the one or more key dialogues from the associated transcript data elements, identifies one or more entry dialogues recited by actors comprising one of protagonists and antagonists in the media asset. The key dialogues engine analysis for identifying the one or more key dialogues recited by actors comprising one of protagonists and antagonists is based on mapping of the characters of the media asset with the face database and the actor information database which is configured as data sources. Further, additionally at 214, the key dialogues engine, for identifying the one or more key dialogues from the associated transcript data elements, identifies one or more of repetitive dialogues and signature dialogues in the media asset. In one embodiment, the repetitive dialogues and signature dialogues are identified based on execution of a probabilistic language model algorithm. The probabilistic language model algorithm is an idea in computational linguistics is to create a probabilistic model of language. Such a model assigns a probability to every sentence in transcript data in such a way that more repetitive sentences and signature dialogues get higher probability.

Additionally, the key dialogues engine is configured to calculate score of each associated transcript data elements based on any know text summarization algorithm for the identification of the one or more key dialogues from the associated transcript data elements. To identify one or more key dialogues from the associated transcript data elements the key dialogues engine is configured to generate vectors for the associated transcript data elements, compute a vector similarity score defining a similarity between each of the vectors, store the vector similarity score of the each of the associated transcript data elements in a similarity matrix, and convert the similarity matrix into a graphical representation. The key dialogues engine computes 214 rank for the each of the associated transcript data elements based on the graphical representation. The key dialogues engine allocates a weightage to each of the configurable criteria and further computes a score for the each of the associated transcript data based on the configurable criteria met by the each of associated transcript data elements and assign a rank to the each of the associated transcript data elements based on the computed score. In one embodiment, the key dialogues engine is configured to compute score for the each of the associated transcript data by passing each for the each of the associated transcript data elements through multiple methods of identifying one or more key dialogues. A flag will be raised for the each of the associated transcript data which satisfies the threshold criteria in each of the multiple methods or sources.

According to one embodiment herein, the key dialogues engine is configured to compute the score for each of the associated transcript data elements by assigning an increment score, for example, +5, for every associated transcript data element that satisfies the threshold criteria in one of the multiple methods of analysis to identify one or more key dialogues. A flag is raised in every associated transcript data element each time an associated transcript data element is the threshold criteria in each of the multiple methods of analysis. The multiple method of analysis includes at least one of the configurable criteria comprising one or more of repetitive keywords, rhyming words, audio signal levels, matching keywords, text-based sentiments, dialogue similarity, repetitive dialogues, signature dialogues, entry dialogues recited by actors comprising protagonists and antagonists, faces of the actors, celebrity detection, image labels, and vector similarity scores. Each time an associated transcript data element satisfies the configurable criteria, a computed score is added to the respective the associated transcript data element. Based on the computed score of each of the associated transcript data elements, the plurality of associated transcript data elements are ranked. These ranked one or more key dialogues are further used in entertainment industry to create, for example, a movie trailer, titbits of a media, and the like.

Figure 5:
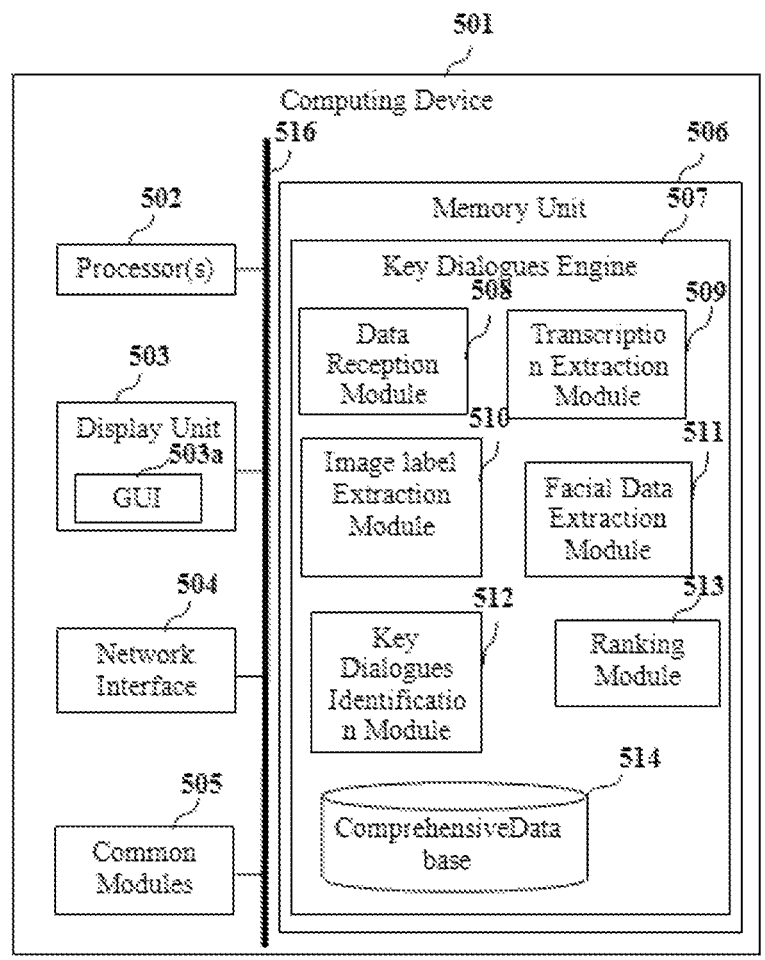
FIG. 5 illustrates an architectural block diagram of an exemplary implementation of a system comprising the key dialogues engine for automatically identifying key dialogues in a media asset, for example, a video, according to one embodiment herein.

FIG. 5 illustrates an architectural block diagram of an exemplary implementation of a system comprising the key dialogues engine 507 for automatically identifying key dialogues in a media asset, for example, a video, according to one embodiment herein. In an embodiment, the key dialogues engine 507 is deployed in a computing device 501 as illustrated in FIG. 5. The computing device 501 is a computer system programmable using high-level computer programming languages. The computing device 501 is an electronic device, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a workstation, a client device, a server, a portable electronic device, a network enabled computing device, an interactive network enabled communication device, an image capture device, any other suitable computing equipment, combinations of multiple pieces of computing equipment, etc. In an embodiment, the key dialogues engine 507 is implemented in the computing device 501 using programmed and purposeful hardware. In an embodiment, the key dialogues engine 507 is a computer-embeddable system that automatically identifies and ranks key dialogues in a media asset.

The key dialogues engine 507 in the computing device 501 communicates with a distributed streaming platform such as the Apache Kafka® platform for receiving messages for downloading media assets via a network, for example, a short-range network or a long-range network. The network is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

Figure 6:
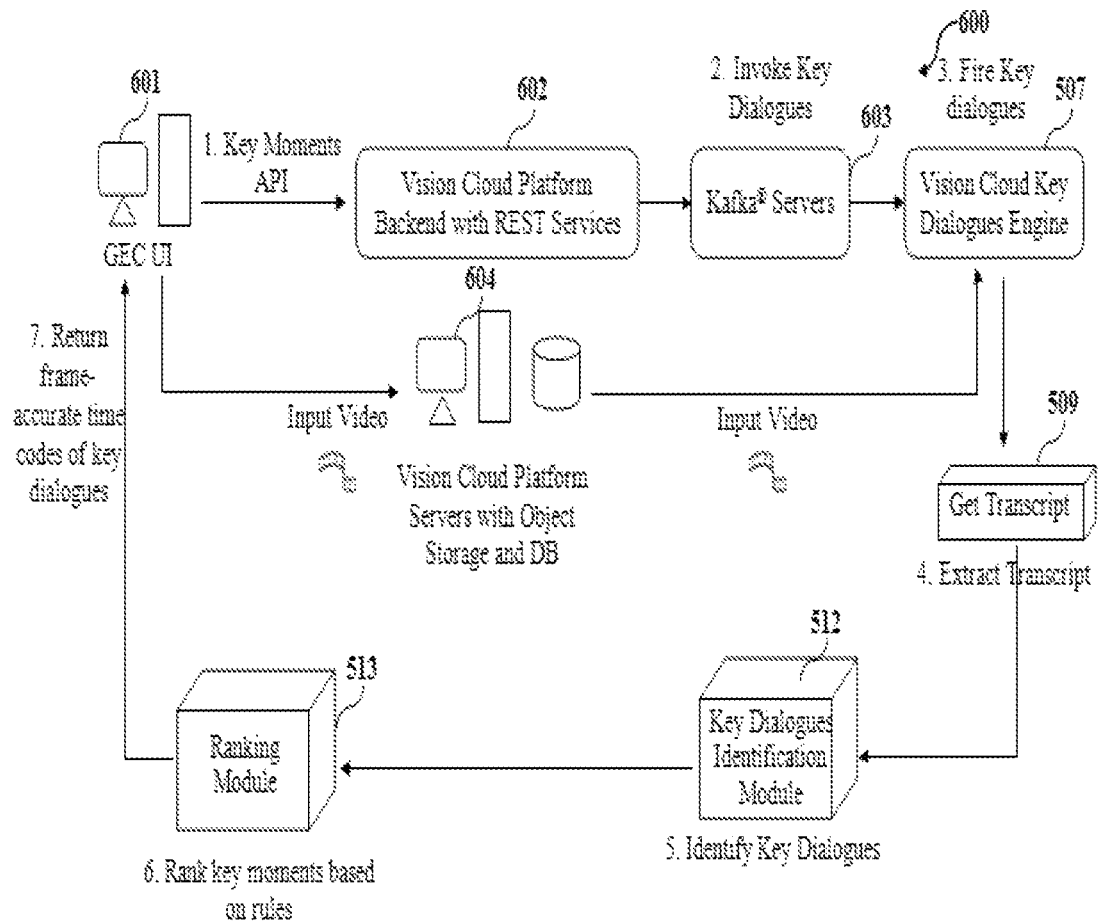
FIG. 6 illustrates a functional block diagram of an exemplary implementation of the system for automatically identifying key dialogues in a media asset, according to one embodiment herein.

In another embodiment, the key dialogues engine 507 is implemented in a cloud computing environment as disclosed in the detailed description of FIG. 6. As used herein, "cloud computing environment" refers to a processing environment comprising configurable computing physical and logical resources, for example, networks, servers, storage media, virtual machines, applications, services, etc., and data distributed over the network. The cloud computing environment provides an on-demand network access to a shared pool of the configurable computing physical and logical resources. In an embodiment, the key dialogues engine 507 is a cloud computing-based platform implemented as a service for automatically identifying and ranking key dialogues in a media asset. In another embodiment, the key dialogues engine 507 is implemented as an on-premises platform comprising on-premise software installed and run-on client systems on the premises of an organization.

As illustrated in FIG. 5, the computing device 501 comprises a non-transitory, computer-readable storage medium, for example, a memory unit 506, for storing computer program instructions defined by modules, for example, 508, 509, 510, 511, 512, 513, etc., of the key dialogues engine 507. As used herein, "non-transitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The computing device 501 further comprises at least one of multiple processors 502 operably and communicatively coupled to the memory unit 506 for executing the computer program instructions defined by the modules, for example, 508, 509, 510, 511, 512, 513, etc., of the key dialogues engine 507. The memory unit 506 is used for storing program instructions, applications, and data. In an embodiment, the memory unit 506 is a random-access memory (RAM) or another type of dynamic storage device that stores information and instructions for execution by the processor(s) 502. The memory unit 506 also stores temporary variables and other intermediate information used during execution of the instructions by the processor(s) 502. In an embodiment, the computing device 501 further comprises a read only memory (ROM) or other types of static storage devices that store static information and instructions for execution by the processor(s) 502. In an embodiment, the modules, for example, 508, 509, 510, 511, 512, 513, 514, etc., of the key dialogues engine 507 are stored in the memory unit 506.

The processor(s) 502 is configured to execute the computer program instructions defined by the modules, for example, 508, 509, 510, 511, 512, 513, etc., of the key dialogues engine 507 for automatically identifying and ranking key dialogues in a media asset. The modules, for example, 508, 509, 510, 511, 512, 513, etc., of the key dialogues engine 507, when loaded into the memory unit 506 and executed by the processor(s) 502, transform the computing device 501 into a specially programmed, special purpose computing device configured to implement the functionality disclosed herein. The processor(s) 502 refers to one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor(s) 502 is implemented as a processor set comprising, for example, a programmed microprocessor and a math or graphics co-processor. The key dialogues engine 507 is not limited to employing the processor(s) 502. In an embodiment, the key dialogues engine 507 employs controllers or microcontrollers. The processor(s) 502 executes the modules, for example, 508, 509, 510, 511, 512, 513, etc., of the key dialogues engine 507.

As illustrated in FIG. 5, the computing device 501 further comprises a data bus 516, a display unit 503, a network interface 504, and common modules 505. The data bus 516 permits communications between the modules, for example, 502, 503, 504, 505, and 506 of the computing device 501. The display unit 503, via a graphical user interface (GUI) 503a, displays information, images, videos, display interfaces, user interface elements such as checkboxes, input text fields, filters, etc., for example, for allowing a user to visualize a ranked list of key dialogues. In an embodiment, the key dialogues engine 507 renders the GUI 503a on the display unit 503 for receiving inputs from the user. The GUI 503a comprises, for example, an online web interface, a web-based downloadable application interface, a mobile-based downloadable application interface, etc.

The network interface 504 enables connection of the computing device 501 to the network. In an embodiment, the network interface 504 is provided as an interface card also referred to as a line card. The network interface 504 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 505 of the computing device 501 comprise, for example, input/output (I/O) controllers, input devices, output devices, fixed media drives such as hard drives, removable media drives for receiving removable media, etc. Computer applications and programs are used for operating the computing device 501. The programs are loaded onto fixed media drives and into the memory unit 506 via the removable media drives. In an embodiment, the computer applications and programs are loaded into the memory unit 506 directly via the network.

In an exemplary implementation illustrated in FIG. 5, the key dialogues engine 507 comprises a data reception module 508, a transcription extraction module 509, an image labels extraction module 510, a facial data extraction module 511, a key dialogues identification module 512, a ranking module 513, and a comprehensive database 514, stored in the memory unit 506 and executed by the processor(s) 502 in the computing device 501. The data reception module 508 receives an input message requesting for identification of key dialogues in a media asset. The input message comprises relevant data, for example, one or more links to download the media asset, for example, from a distributed streaming platform such as the Apache Katha® platform, and process details. The data reception module 508 downloads the media asset from the distributed streaming platform and stores the media asset in the comprehensive database 514. The transcription extraction module 509 extracts the transcript of the media asset. The transcription extraction module 509 divides the transcript data into plurality of transcript data elements. The image labels extraction module 510 extracts image label of each frame of the media asset such as the video clip through image analysis. The one skilled in the art would understand that the extraction of the image label of each of the frames of the media asset is carried out through any standardized AI-based methods known in the art or invented in the future. The facial data extraction module 511 extracts facial recognition data of characters present in the video. In one embodiment, the facial recognition data is extracted based on any known video metadata extraction AI engine. In one example, the video metadata extraction AI engine receives the video clip and further extracts all frames in the video clip and process each frame to get the data of character faces. Further, the processor(s) 502 is configured to associate the image label data received through the image label extraction module 510 and the facial recognition data received through the facial data extraction module 511 with the divided plurality of transcript data elements to generate a plurality of associated transcript data elements.

The key dialogues identification module 512 identifies one or more key dialogues from the plurality of associated transcript data elements as follows. In an embodiment, the key dialogues identification module 510 identifies one or more key dialogues from the plurality of associated transcript data elements based on configurable criteria, wherein the configurable criteria comprises one or more of repetitive keywords, rhyming words, audio signal levels, matching keywords, text-based sentiments, dialogue similarity, repetitive dialogues, signature dialogues, entry dialogues recited by actors comprising protagonists and antagonists, faces of the actors, celebrity detection, image labels, and vector similarity scores. Once identified, the one or more key dialogues are stored in the comprehensive database 514. The ranking module 513 computes a rank for each of the identified key dialogues based on ranking criteria. The ranking module 513 allocates a weightage to each of the configurable criteria and further computes a score for the each of the associated transcript data based on the configurable criteria met by the each of associated transcript data elements and assign a rank to the each of the associated transcript data elements based on the computed score. In one embodiment, the ranking module 513 is configured to compute score for the each of the associated transcript data by passing each for the each of the associated transcript data elements through multiple methods of identifying one or more key dialogues. A flag will be raised for the each of the associated transcript data which satisfies the threshold criteria in each of the multiple methods or sources.

According to one embodiment herein, the key dialogues engine 507 further comprises a comprehensive database 515 for storing information of at least one or more of a rhyming word database, a keyword database, a dialogues database, an actor information database, a face database, an image labels database, and the like. In an embodiment, the modules such as the data reception module 508, the transcription extraction module 509, the image labels extraction module 510, the facial data extraction module 511, the key dialogues identification module 512, and the ranking module 513 communicates with the comprehensive database 514 to identify wordplay keywords, rhyming keywords, repetitive keywords, repetitive dialogues, key events, protagonists and antagonists, text ranking, and the like. Each of the databases in the system, for example, the comprehensive database 514, refers to any storage area or medium that can be used for storing data and media assets. In an embodiment, the database 514 is any of a structured query language (SQL) database or a not only SQL (NoSQL) database. In an embodiment, the database 514 is a location on a file system. In another embodiment, the database 514 is configured to be remotely accessible by the key dialogues engine 507 in the computing device 501 via the network. In another embodiment, the database 514 is configured as a cloud-based database implemented in a cloud computing environment.

The processor(s) 502 retrieves instructions defined by the data reception module 508, the transcription extraction module 509, the image labels extraction module 510, the facial data extraction module 511, the key dialogues identification module 512, and the ranking module 513 from the memory unit 506 for performing respective functions disclosed above. The data reception module 508, the transcription extraction module 509, the image labels extraction module 510, the facial data extraction module 511, the key dialogues identification module 512, and the ranking module 513 of the key dialogues engine 507 are disclosed above as software executed by the processor(s) 502. In an embodiment, the modules, for example, 508, 509, 510, 511, 512, 513, etc., of the key dialogues engine 507 are implemented completely in hardware. In another embodiment, the modules, for example, 508, 509, 510, 511, 512, 513, etc., of the key dialogues engine 507 are implemented by logic circuits to carry out their respective functions disclosed above. In another embodiment, the key dialogues engine 507 is also implemented as a combination of hardware and software and one or more processors, for example, 502, that are used to implement the modules, for example, 508, 509, 510, 511, 512, 513, etc., of the key dialogues engine 507.

For purposes of illustration, the detailed description refers to the modules, for example, 508, 509, 510, 511, 512, 513, 514, etc., of the key dialogues engine 507 being run locally on a single computing device 501; however the scope of the system and the method disclosed herein is not limited to the modules, for example, 508, 509, 510, 511, 512, 513, 514, etc., of the key dialogues engine 507 being run locally on a single computing device 501 via the operating system and the processor(s) 502, but may be extended to run remotely over the network by employing a web browser and a remote server, a mobile phone, or other electronic devices. In an embodiment, one or more portions of the system disclosed herein are distributed across one or more computer systems (not shown) coupled to the network.

The non-transitory, computer-readable storage medium disclosed herein stores computer program instructions executable by the processor(s) 502 for automatically identifying and ranking key dialogues in a media asset. The computer program instructions implement the processes of various embodiments disclosed above and perform additional steps that may be required and contemplated for automatically identifying and ranking key dialogues in a media asset. When the computer program instructions are executed by the processor(s) 502, the computer program instructions cause the processor(s) 502 to perform the steps of the method for automatically identifying and ranking key dialogues in a media asset as disclosed in the detailed descriptions of FIGS. 1-4. In an embodiment, a single piece of computer program code comprising computer program instructions performs one or more steps of the method disclosed in the detailed descriptions of FIGS. 1-4. The processor(s) 502 retrieves these computer program instructions and executes them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, C, C++, C#, Java®, JavaScript®, Fortran, Ruby, Perl®, Python®, Visual Basic®, Microsoft® .NET, Objective-C®, etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

FIG. 6 illustrates a functional block diagram of an exemplary implementation of the system 600 for automatically identifying key dialogues in a media asset, according to one embodiment herein. In this exemplarily implementation, the system 600 disclosed herein comprises a vision cloud platform 601 with a general entertainment content (GEC) user interface (III), a vision cloud backend engine 602 with representational state transfer (REST) servers, vision cloud platform servers 604 with object storage and databases, Kafka® servers 603, and the key dialogues engine 507. The key dialogues engine 507 is implemented on a vision cloud, that is, a consortium of artificial intelligence (AI)-powered services hosted on cloud servers. Media assets are typically uploaded to the cloud and a request for invoking the key dialogues identification process is received by the key dialogues engine 507 through a messaging service, for example, a Kafka® messaging service executed by the Kafka® servers 603. In the key dialogues identification process, the key dialogues engine 507 parses a video stream of a video file into interesting events, herein referred to as "key dialogues", at a given point in time. The key dialogues engine 507 invokes various services depending upon the process requirements to generate start and end time codes for the key dialogues.

On receiving the request and downloading a media asset, for example, a video file, for identification of key dialogues therein, the transcript extractor 509 extracts the transcript data of the media asset. The transcript extractor 509 then divides the transcript data into a plurality of transcript data elements. The transcript extractor 509 further supports extraction of image labels of each frame of the media asset and support extraction of facial data of characters present in the media asset. The extracted image labels and the facial data of each frame of the media asset is associated with the divided plurality of transcript data elements to generate a plurality of associated plurality of transcript data elements. In an embodiment, the key dialogues identification module 512, in communication with the transcript extractor 509, identifies one or more key dialogues from the plurality of associated transcript data elements based on configurable criteria, wherein the configurable criteria comprises one or more of repetitive keywords, rhyming words, audio signal levels, matching keywords, text-based sentiments, dialogue similarity, repetitive dialogues, signature dialogues, entry dialogues recited by actors comprising protagonists and antagonists, faces of the actors, celebrity detection, image labels, and vector similarity scores as disclosed in the detailed descriptions of FIGS. 1-4. Once the key dialogues are identified, the ranking module 513 ranks each key dialogues based on rules as description of FIG. 4.

After ranking is performed, the key dialogues identification module 512 stores the start and end time codes of the key dialogues in a database along with the audio plot of the key dialogues. In an embodiment, the ranking module 513 displays the ranked list of key dialogues on a graphical user interface for visualization. In an embodiment, the ranking module 513 returns frame-accurate time codes of the key dialogues to the vision cloud platform 601. The ranking module 513 also sends an array of dictionaries that contains the details of the key dialogues to the vision cloud platform 601 using representational state transfer (REST) application programming interfaces (API) credentials in the initial Kafka® message received by the key dialogues engine 507. An example representation of the array of dictionaries that is sent to the vision cloud platform 601 is disclosed below:

[{"end": 32.8, start": 0.0, "peakDrop": 30.75, "peakStart": 0.0, "rank": 4, "plotUrl": "path/to/cloud/audioPlot.png", "shots": [{"end": 2.92, "start": 0.0, "plotUrl": "path/to/cloudiaudioPlotShot1.png"}, {"end": 11.84, "start": 2.92, "plotUrl": "path/toicloudiaudioPlotShot2.png"}, {"end": 32.8, "start": 11.84, "plotUrl": "path/to/cloud/audioShot3.png"}]}, { . . . }, { . . . }, . . . , { . . . }]

where the fields "end" and "start" refer to the points in seconds when the key dialogues ends and starts respectively, after these points are fit to shot boundaries; "peakDrop" and "peakStart" refer to the points in seconds when the key dialogues ends and starts respectively; "rank" refers to an integer that represents how high the key dialogue is ranked by the ranking module 513; "plotUrl" refers to a link to the audio plot of the key dialogue uploaded to a binary large object (BLOB); and "shots" refers to an array that contains start and end time codes of each shot in the key dialogue along with the link to the audio plot for that shot. The vision cloud platform 601 accesses these details to cut the video in the video file into frame-accurate key dialogues along with the audio plot of each key dialogues.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the methods disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. In another embodiment, various aspects of the embodiments disclosed herein are implemented in a non-programmed environment comprising documents created, for example, in a hypertext markup language (HTML), an extensible markup language (XML), or other format that render aspects of a GUI or perform other functions, when viewed in a visual area or a window of a browser program. Various aspects of the embodiments disclosed herein are implemented as programmed elements, or non-programmed elements, or any suitable combination thereof.

Where databases are described illustrated in FIG. 5, will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

According to one embodiment herein, the embodiments are configured to operate in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers. The embodiments disclosed herein are not limited to a particular computer system platform, processor, operating system, or network.

The foregoing examples and illustrative implementations of various embodiments have been provided merely for explanation and are in no way to be construed as limiting of the present invention. While the present invention has been described with reference to various illustrative implementations, techniques, and embodiments, it is understood that the words, which have been used herein, are words of description and illustration, rather than words of limitation. Further, although the present invention has been described herein with reference to particular means, materials, techniques, embodiments, and implementations, the present invention is not intended to be limited to the particulars disclosed herein; rather, the present invention extends to all functionally equivalent structures, methods and uses, such as are within the scope of the appended claims.

It will be understood by those skilled in the art, having the benefit of the teachings of this specification, that the present invention is capable of modifications and other embodiments may be effected and changes may be made thereto, without departing from the scope and spirit of the present invention.

We claim:

1. A system for automatically identifying key dialogues in a media asset, the system comprising:
   at least one processor;
      a non-transitory, computer-readable storage medium operably and communicatively coupled to the at least one processor and configured to store the media asset and computer program instructions executable by the at least one processor; and
      a key dialogues engine configured to define the computer program instructions, which when executed by the at least one processor, cause the at least one processor to:
         receive the media asset and extract characteristic data from the media asset, wherein the characteristic data comprises transcript data and supplementary data;
         process the transcript data into a plurality of transcript data elements and associate the transcript data elements with respective data elements selected from the supplementary data; and
         identify one or more key dialogues from the associated transcript data elements based on configurable criteria, in operable communication with one or more of a plurality of data sources, wherein the configurable criteria comprise one or more of repetitive keywords, rhyming words, audio signal levels, matching keywords, text-based sentiments, dialogue similarity, repetitive dialogues, signature dialogues, entry dialogues recited by actors comprising protagonists and antagonists, faces of the actors, celebrity detection, image labels, and vector similarity scores;
   Characterized in that:
      wherein the supplementary data comprises at least one of image label data and face recognition data, and wherein the at least one processor is configured to divide the transcript data into a plurality of sentence data elements, and to associate each of the sentence data elements with respective image label data and face recognition data in accordance with time codes of the sentence data elements, during the processing of the transcript data;
      wherein the at least one processor is configured to generate a comprehensive database from the plurality of data sources, and wherein the comprehensive database is configured to store a plurality of keywords, rhyming words, dialogues, image labels, text-based sentiments, face data of actors, image label data, and information of actors selected from a plurality of media assets;
      wherein the at least one processor is configured to allocate a weightage to each of the configurable criteria, compute a score for the each of the associated transcript data elements based on the configurable criteria met by the each of associated transcript data elements, and rank the each of the associated transcript data elements based on the computed score,
      wherein the at least one processor is configured to determine occurrence of one or more key audio events proximal to each of the associated transcript data elements based on the audio signal levels of the media asset, for identifying the one or more key dialogues from the associated transcript data elements based on the audio signal levels;

wherein the at least one processor is configured to classify each of the associated transcript data elements as one of positive, negative, and neutral, and compute a probability for the each of the associated transcript data elements, for identifying the one or more key dialogues from the associated transcript data elements based on the text-based sentiments;

wherein the at least one processor is configured to generate vectors for the associated transcript data elements, compute a vector similarity score defining a similarity between each of the vectors, store the vector similarity score of the each of the associated transcript data elements in a similarity matrix, and convert the similarity matrix into a graphical representation for computation of a rank of the each of the associated transcript data elements, for identifying the one or more key dialogues from the associated transcript data elements.

2. The system as claimed in claim 1, wherein the at least one processor is configured to identify one or more keywords that are repeated in individual and adjacent ones of the associated transcript data elements, in communication with a keyword database configured as one of the data sources, for identifying the one or more key dialogues from the associated transcript data elements based on the repetitive keywords.

3. The system as claimed in claim 1, wherein the at least one processor is configured to identify one or more rhyming words having a similar phonetics scheme in individual and adjacent ones of the associated transcript data elements, in communication with a rhyming word database configured as one of the data sources, for identifying the one or more key dialogues from the associated transcript data elements based on the rhyming words.

4. The system as claimed in claim 1, wherein the at least one processor is configured to extract keywords from each of the associated transcript data elements and compare the extracted keywords with a predetermined list of keywords to determine a count of the matching keywords in the each of the associated transcript data elements, and wherein the predetermined list of keywords is stored in a keyword database configured as one of the data sources, for identifying the one or more key dialogues from the associated transcript data elements based on the matching keywords.

5. The system as claimed in claim 1, wherein the at least one processor is configured to determine a similarity parameter defining a similarity between each of the associated transcript data elements and each of a plurality of dialogues, and wherein the plurality of dialogues is stored in a dialogues database configured as one of the data sources, for identifying the one or more key dialogues from the associated transcript data elements based on the dialogue similarity.

6. The system as claimed in claim 1, wherein the at least one processor is configured to identify one or more of repetitive dialogues and signature dialogues in the media asset by executing a probabilistic language model algorithm, for identifying the one or more key dialogues from the associated transcript data elements.

7. The system as claimed in claim 1, wherein the at least one processor is configured to identify one or more entry dialogues recited by actors comprising one of protagonists and antagonists in the media asset, in communication with a face database and an actor information database configured as data sources, for identifying the one or more key dialogues from the associated transcript data elements.

8. The system as claimed in claim 1, wherein the at least one processor is configured to identify presence of one or more celebrities within time codes of the each of the associated transcript data elements, in communication with one or more of a face database and an actor information database configured as data sources, for identifying the one or more key dialogues from the associated transcript data elements based on the celebrity detection.

9. The system as claimed in claim 1, wherein the at least one processor is configured to determine a match in the image labels that are present within time codes of the each of the associated transcript data elements with a predetermined list of image labels, wherein the predetermined list of image labels is stored in an image labels database configured as one of the data sources, for identifying the one or more key dialogues from the associated transcript data elements based on the image labels.

10. A method executed by a key dialogues engine comprising at least one processor for automatically identifying key dialogues in a media asset, the method comprises steps of:

receiving the media asset and extracting characteristic data from the media asset, wherein the characteristic data comprises transcript data and supplementary data;

processing the transcript data into a plurality of transcript data elements and associating the transcript data elements with respective data elements selected from the supplementary data; and identifying one or more key dialogues from the associated transcript data elements based on configurable criteria, in operable communication with one or more of a plurality of data sources, wherein the configurable criteria comprise one or more of repetitive keywords, rhyming words, audio signal levels, matching keywords, text-based sentiments, dialogue similarity, repetitive dialogues, signature dialogues, entry dialogues recited by actors comprising protagonists and antagonists, faces of the actors, celebrity detection, image labels, and vector similarity scores;

ranking the each of the associated transcript data elements by the key dialogues engine by:

allocating a weightage to each of the configurable criteria by the key dialogues engine;

computing a score for the each of the associated transcript data elements by the key dialogues engine based on the configurable criteria met by the each of associated transcript data elements; and assigning a rank to the each of the associated transcript data elements based on the computed score;

Characterized in that:

wherein the supplementary data comprises at least one of image label data and face recognition data, and wherein the processing of the transcript data comprises dividing the transcript data into a plurality of sentence data elements by the key dialogues engine, and associating each of the sentence data elements with respective image label data and face recognition data in accordance with time codes of the sentence data elements by the key dialogues engine;

wherein the identification of the one or more key dialogues from the associated transcript data elements based on the audio signal levels comprises determining occurrence of one or more key audio events proximal to each of the associated transcript data elements by the key dialogues engine based on the audio signal levels of the media asset;

wherein the identification of the one or more key dialogues from the associated transcript data elements based on the text-based sentiments comprises classifying each of the associated transcript data elements as one of positive, negative, and neutral, and computing a probability for the each of the associated transcript data elements, by the key dialogues engine;

wherein the identification of the one or more key dialogues from the associated transcript data elements based on the dialogue similarity comprises determining a similarity parameter defining a similarity between each of the associated transcript data elements and each of a plurality of dialogues by the key dialogues engine, wherein the plurality of dialogues is stored in a dialogues database configured as one of the data sources;

wherein the identification of the one or more key dialogues from the associated transcript data elements comprises identifying one or more of repetitive dialogues and signature dialogues in the media asset by the key dialogues engine by executing a probabilistic language model;

wherein the identification of the one or more key dialogues from the associated transcript data elements based on the image labels comprises determining a match in the image labels that are present within time codes of the each of the associated transcript data elements with a predetermined list of image labels by the key dialogues engine, wherein the predetermined list of image labels is stored in an image labels database configured as one of the data sources;

wherein the identification of the one or more key dialogues from the associated transcript data elements comprises:

generating vectors for the associated transcript data elements by the key dialogues engine;

computing a vector similarity score defining a similarity between each of the vectors by the key dialogues engine;

storing the vector similarity score of the each of the associated transcript data elements in a similarity matrix by the key dialogues engine; and converting the similarity matrix into a graphical representation by the key dialogues engine for computation of a rank of the each of the associated transcript data elements.

11. The method as claimed in claim 10, wherein the identification of the one or more key dialogues from the associated transcript data elements based on the repetitive keywords comprises identifying one or more keywords that are repeated in individual and adjacent ones of the associated transcript data elements, by the key dialogues engine in communication with a keyword database configured as one of the data sources.

12. The method as claimed in claim 10, wherein the identification of the one or more key dialogues from the associated transcript data elements based on the rhyming words comprises identifying one or more rhyming words having a similar phonetics scheme in individual and adjacent ones of the associated transcript data elements, by the key dialogues engine in communication with a rhyming word database configured as one of the data sources.

13. The method as claimed in claim 10, wherein the identification of the one or more key dialogues from the associated transcript data elements based on the matching keywords comprises extracting keywords from each of the associated transcript data elements and comparing the extracted keywords with a predetermined list of keywords by the key dialogues engine to determine a count of the matching keywords in the each of the associated transcript data elements, wherein the predetermined list of keywords is stored in a keyword database configured as one of the data sources.

14. The method as claimed in claim 10, wherein the identification of the one or more key dialogues from the associated transcript data elements comprises identifying one or more entry dialogues recited by actors comprising one of protagonists and antagonists in the media asset, by the key dialogues engine in communication with a face database and an actor information database configured as data sources.

15. The method as claimed in claim 10, wherein the identification of the one or more key dialogues from the associated transcript data elements based on the celebrity detection comprises identifying presence of one or more celebrities within time codes of the each of the associated transcript data elements, by the key dialogues engine in communication with one or more of a face database and an actor information database configured as data sources.

* * * * *